United States Patent
Rieder et al.

(10) Patent No.: US 12,098,944 B2
(45) Date of Patent: Sep. 24, 2024

(54) ARRANGEMENT AND METHOD FOR IDENTIFYING AND CORRECTING A FAULTY VOLUMETRIC FLOW MEASUREMENT

(71) Applicant: Endress+Hauser Flowtec AG, Reinach (CH)

(72) Inventors: Alfred Rieder, Landshut (DE); Hao Zhu, Freising (DE); Wolfgang Drahm, Freising (DE); Andreas Güttler, Zolling (DE)

(73) Assignee: Endress+Hauser Flowtec AG, Reinach (CH)

( * ) Notice: Subject to any disclaimer, the term of this patent is extended or adjusted under 35 U.S.C. 154(b) by 244 days.

(21) Appl. No.: 17/754,074

(22) PCT Filed: Aug. 20, 2020

(86) PCT No.: PCT/EP2020/073412
§ 371 (c)(1),
(2) Date: Mar. 23, 2022

(87) PCT Pub. No.: WO2021/058207
PCT Pub. Date: Apr. 1, 2021

(65) Prior Publication Data
US 2022/0333971 A1 Oct. 20, 2022

(30) Foreign Application Priority Data
Sep. 24, 2019 (DE) ...................... 10 2019 125 682.8

(51) Int. Cl.
*G01F 25/10* (2022.01)
*G01F 1/36* (2006.01)
(Continued)

(52) U.S. Cl.
CPC ............... *G01F 25/10* (2022.01); *G01F 1/36* (2013.01); *G01F 1/84* (2013.01); *G01F 1/74* (2013.01); *G01F 7/005* (2013.01)

(58) Field of Classification Search
CPC ..... G01F 25/10; G01F 1/36; G01F 1/84; G01F 1/74; G01F 7/005
See application file for complete search history.

(56) References Cited

U.S. PATENT DOCUMENTS

2007/0017304 A1  1/2007  Kumpfmüller
2011/0029259 A1  2/2011  Cunningham et al.

FOREIGN PATENT DOCUMENTS

DE   102005046319 A1   3/2007
DE   102007019689 A1   10/2008
(Continued)

*Primary Examiner* — Peter J Macchiarolo
*Assistant Examiner* — John M Royston
(74) *Attorney, Agent, or Firm* — Kelly J. Smith; Endress+Hauser (USA) Holding, Inc.

(57) ABSTRACT

An arrangement includes a pipeline and a Coriolis volumetric flow meter for measuring a mass flow rate of a medium flowing through the pipeline. A first pressure sensor is attached at an inlet-side of the pipeline and a second pressure sensor is attached at an outlet-side of the pipeline, or wherein a differential pressure sensor is configured to detect a difference between an inlet-side and an outlet-side. The pressure sensors and/or the differential pressure sensor are configured to measure a media pressure and to determine, for each differential pressure, a volumetric flow velocity of the medium through the pipeline. A first monitoring sensor is attached at an inlet-side portion of the pipeline and a second monitoring sensor is attached at an outlet-side portion of the pipeline, wherein the monitoring sensors are configured to monitor a measurement variable different from the media pressure to identify a static media state.

8 Claims, 3 Drawing Sheets

(51) Int. Cl.
  *G01F 1/74*    (2006.01)
  *G01F 1/84*    (2006.01)
  *G01F 7/00*    (2006.01)

(56) References Cited

FOREIGN PATENT DOCUMENTS

DE      102017130970 A1    6/2019
DE      102018102631 A1    8/2019
WO    WO-2018174841 A1 *   9/2018  ........... G01F 1/8436

\* cited by examiner

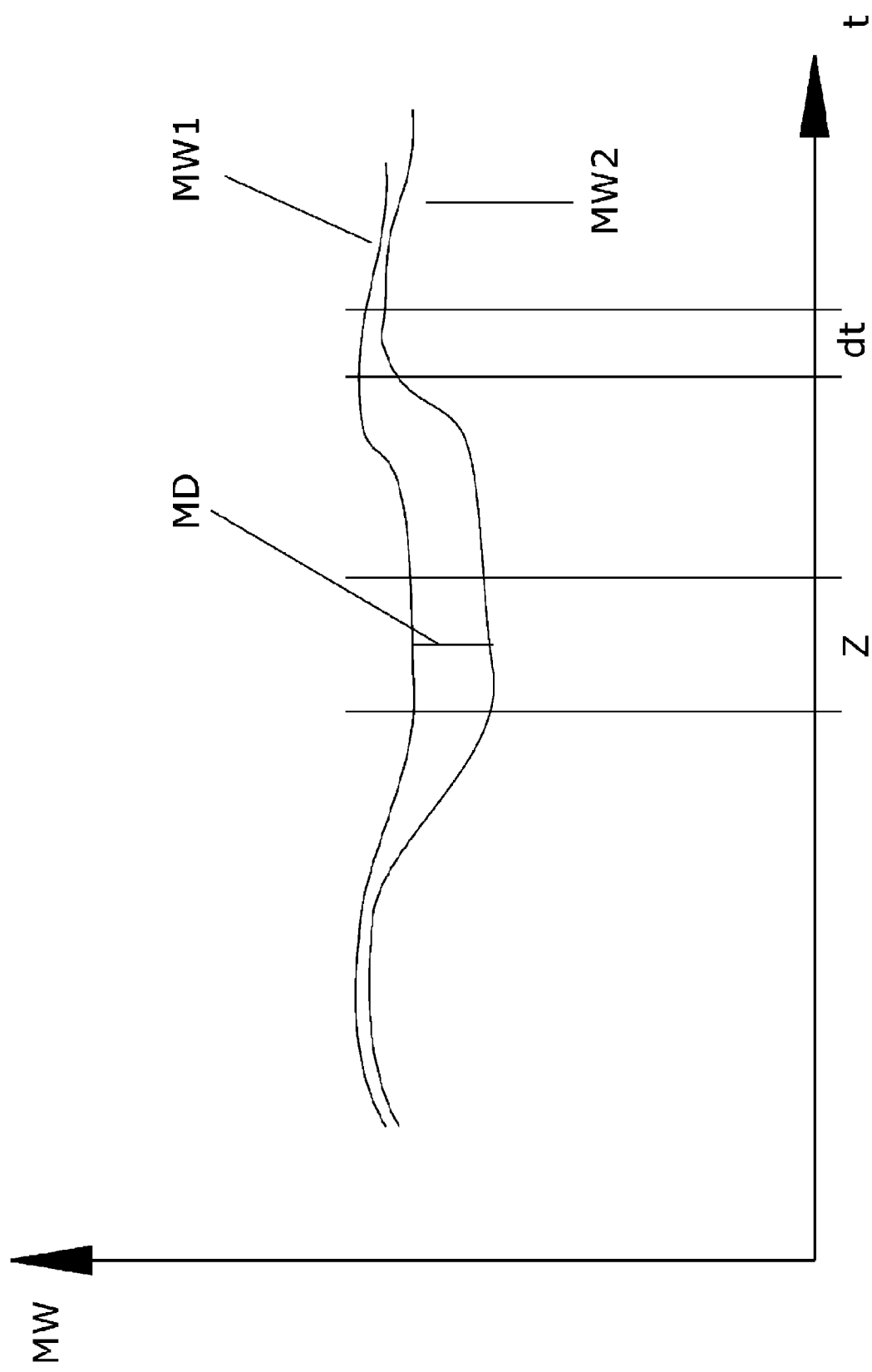

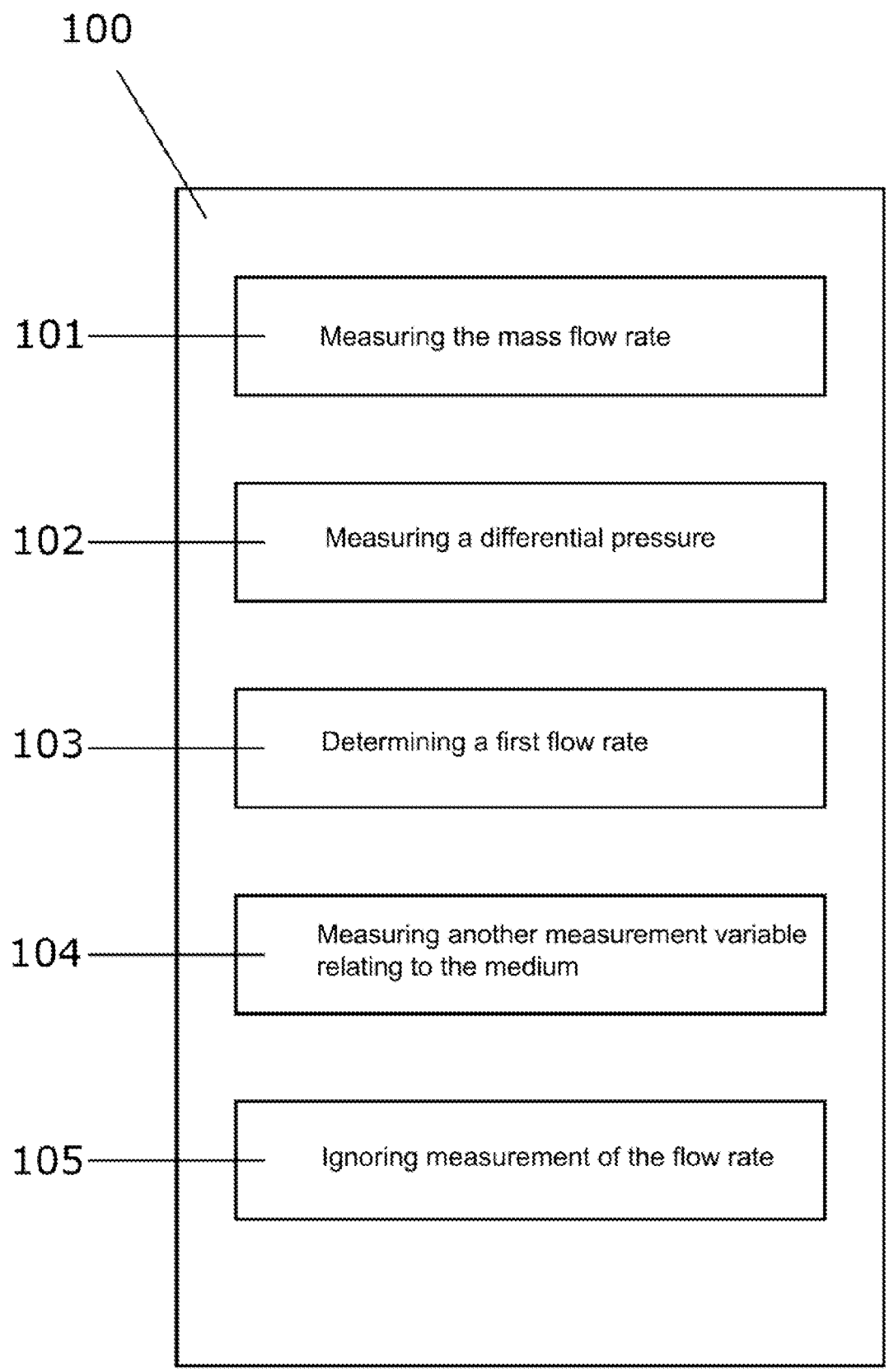

ARRANGEMENT AND METHOD FOR IDENTIFYING AND CORRECTING A FAULTY VOLUMETRIC FLOW MEASUREMENT

CROSS-REFERENCE TO RELATED APPLICATIONS

The present application is related to and claims the priority benefit of German Patent Application No. 10 2019 125 682.8, filed on Sep. 24, 2019, and International Patent Application No. PCT/EP2020/073412, filed on Aug. 20, 2020, the entire contents of which are incorporated herein by reference.

TECHNICAL FIELD

The invention relates to an arrangement and a method for identifying and correcting a faulty volumetric flow measurement in a Coriolis volumetric flow meter.

BACKGROUND

Coriolis volumetric flow meters, as shown for example in DE 102015120087A1, have a reduced measurement accuracy in the case of liquids with gas inclusions or entrained gas. This can be compensated for by a measurement of a pressure difference between an inlet and an outlet of a measuring tube of the Coriolis measuring device, since, in the case of low flow rate, a better statement about the flow rate can be made on the basis of this pressure difference. However, it has become apparent that this pressure difference can also be unreliable.

SUMMARY

It is therefore an aim of the invention to propose an arrangement and a method for the purpose of reliable volumetric flow measurement.

The aim is achieved by an arrangement according to independent claim 1, and by a method according to independent claim 4.

An arrangement according to the invention for identifying a faulty volumetric flow measurement comprises:

a pipeline;

a Coriolis volumetric flow meter comprising at least one measuring tube, in each case with an inlet and an outlet, configured to measure a mass flow rate of a medium flowing through the pipeline;

wherein a first pressure sensor in or on an inlet-side portion of the pipeline and a second pressure sensor in or on an outlet-side portion of the pipeline are configured for this purpose, and/or wherein a differential pressure sensor is configured to detect a pressure difference between an inlet-side portion of the pipeline and an outlet-side portion of the pipeline, wherein the pressure sensors and/or the differential pressure sensor are configured to determine a flow rate of the medium through the pipeline for each determination of a differential pressure between an inlet-side portion of the pipeline and an outlet-side portion of the pipeline;

wherein a first monitoring sensor is attached in or on an inlet-side portion of the pipeline, and a second monitoring sensor is attached in or on an outlet-side portion of the pipeline, wherein the monitoring sensors are configured to monitor a measurement variable different from the medium pressure in order to identify a static medium state.

By means of the monitoring sensors, it is thus possible to monitor whether the determined differential pressure is caused by a statically or by a quasi-statically changing or moving liquid column or by a significant flow rate, and, if necessary, to correct a volumetric flow measurement for each differential pressure measurement. By means of such an arrangement, a reliable measurement of the flow can be made possible in the case of flow rates in which a Coriolis volumetric flow meter has a lower measurement accuracy.

In one development, a measurement variable of the monitoring sensors is at least one from the following list:

medium density, viscosity, sound velocity, conductivity, thermal capacity, electrical capacity, physical state of the medium.

In one development, an electronic measurement/control circuit of the Coriolis volumetric flow meter is configured to receive and process measurement signals of the monitoring sensors, the pressure sensors, and/or the differential pressure sensor, and to make a statement regarding the flow rate of the medium, or an external computer is configured to receive and process measurement signals of the monitoring sensors, the pressure sensors, and/or the differential pressure sensor, as well as volumetric flow measured values of the electronic measurement/control circuit, and to make a statement regarding the flow rate of the medium.

By measuring or monitoring at least one of the measurement variables between an inlet-side portion of the pipeline and an outlet-side portion of the pipeline, a different physical state, for example, can be determined and interpreted as an indication of a static liquid column.

A method according to the invention has the following steps:

measuring with a Coriolis volumetric flow meter a mass flow rate of a medium flowing through a pipeline, wherein the Coriolis volumetric flow meter is connected to the pipeline via an inlet and an outlet, measuring a differential pressure of the medium between an inlet-side portion of the pipeline and an outlet-side portion of the pipeline, determining a first flow rate of the medium through the pipeline on the basis of the differential pressure measurement, characterized in that the method has the following steps:

measuring a medium-related measurement variable other than the medium pressure with a first monitoring sensor in or at the inlet-side portion of the pipeline and a second monitoring sensor in or at the outlet-side portion of the pipeline, ignoring the measurement of the flow rate for each differential pressure measurement if a static or quasi-static medium state is determined by means of the monitoring sensors.

In one development, identification of the static medium state has the following steps:

producing a first measured value curve with the first monitoring sensor, and producing a second measured value curve with the second monitoring sensor;

interpreting a measured value difference between measured values of the first measured value curve and measured values of the second measured value curve as a consequence of a static medium state if the measured value difference relative to a first mean value of the corresponding measured values is greater than a first threshold value, and/or determining a second flow rate from a cross-correlation between the first measured value curve and the second measured value curve and interpreting a deviation of the second flow rate relative to a second mean value from the first flow rate and the second flow rate as a consequence of a static medium state if the deviation is greater than a second threshold value, and/or interpreting a measured value difference between measured values of the first measured value curve and measured values of the second measured value curve as a consequence of a static medium state if the measured value difference is constant over a period of time.

A constant measured value difference can be identified, for example, by a fluctuation of measured values about a mean value over the time period being less than a prespecified value. Such a value can be determined, for example, from a limit for a standard deviation or from a variance. A person skilled in the art will adjust such a value to the arrangement or the method.

In one development, the first threshold value is, for example, at least 20%, and in particular at least 40% and preferably at least 50%, greater than the first mean value, and/or wherein the second threshold value is, for example, at least 20%, and in particular at least 40% and preferably at least 50%, greater than the second mean value.

In one development, the time period is more than 2 seconds, and in particular more than 4 seconds and preferably more than 5 seconds.

BRIEF DESCRIPTION OF THE DRAWINGS

The invention will now be described with reference to exemplary embodiments.

FIG. 2 schematically shows measured value curves.

FIG. 3 shows a schematic method.

DETAILED DESCRIPTION

Figure 1:
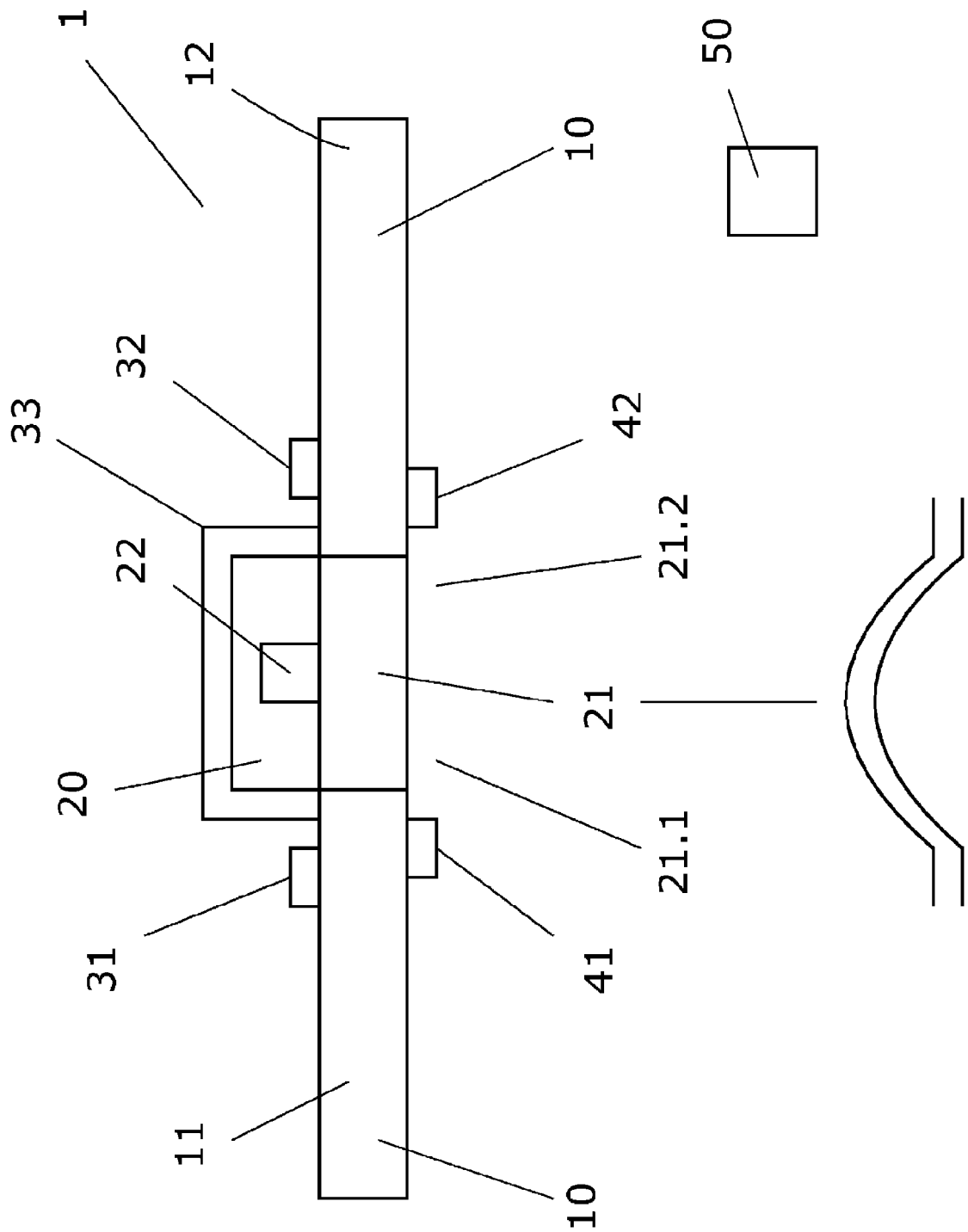
FIG. 1 schematically shows an arrangement according to the present disclosure.

FIG. 1 shows an arrangement 1 according to the invention with a Coriolis measuring device 20 with a measuring tube 21 which is arranged in a pipeline 10. An inlet 21.1 of the measuring tube 21 is connected in an upstream portion 11 of the pipeline, and an outlet 21.2 to a downstream portion 12 of the pipeline. A Coriolis measuring device can also have more than one measuring tube; the illustration selected here is to be interpreted as an example, and not restrictively. A first pressure sensor 31 and a first monitoring sensor 41 are arranged on the inlet-side portion of the pipeline 11, and a second pressure sensor 32 and a second monitoring sensor 42 are arranged on the outlet-side portion of the pipeline 12. Alternatively and/or in addition to the pressure sensors, a differential pressure sensor 33 can also be set up as schematically illustrated here. The positioning of the sensors 31, 32, 33, 41, 42 relative to one another is purely exemplary. The sensors can also be arranged inside the pipeline, for example. The pressure sensors or the differential pressure sensor are configured to determine a differential pressure between the inlet 21.1 of the measuring tube and the outlet 21.2 of the measuring tube. If the mass flow rate of a medium through the pipeline is low, so that the Coriolis volumetric flow meter is operating with lower reliability and measuring accuracy, a measured value for a mean flow rate of the medium through the pipeline can be determined by means of differential pressure measurement, which measured value can be used for a further or alternative mass volumetric flow measurement. Coriolis measuring devices 20 can, as schematically indicated, have measuring tubes with in each case a measuring tube curve, or even have straight measuring tubes. Under certain conditions, a static or quasi-static liquid column with a liquid level can form between the inlet and the outlet in at least one measuring tube, which static liquid column produces a differential pressure between the inlet 21.2 and the outlet 21.2. In this case, a flow rate measurement based upon a differential pressure will deliver incorrect measured values. By means of the first monitoring sensor and the second monitoring sensor, the presence of a liquid column falsifying measured values can now be checked. Upon identification of such a static liquid column, measurement of the flow rate for each differential pressure measurement can be ignored, so that the Coriolis measuring device reports a zero flow.

The first monitoring sensor 41 and also the second monitoring sensor 42 can monitor, for example, at least one of the following measurement variables of the medium: mass density, viscosity, sound velocity, conductivity, thermal capacity, electrical capacity, physical state. In this way, a two-phase nature of the medium in the form of a liquid column can be detected.

An electronic measurement/control circuit 22 of the Coriolis volumetric flow meter is configured to receive and process measurement signals of the monitoring sensors, the pressure sensors, and/or the differential pressure sensor, and to make a statement regarding the flow rate of the medium, or an external computer 50 is configured to receive and process measurement signals of the monitoring sensors, the pressure sensors, and/or the differential pressure sensor, as well as measured volumetric flow values of the electronic measurement/control circuit, and to make a statement regarding the flow rate of the medium. The electronic measurement/control circuit is usually arranged in a housing (not shown) provided for this purpose, but this is known from the prior art and familiar to the person skilled in the art. The transmission of measurement signals and measured values takes place, for example, via electrical connecting lines and/or via wireless connections. For reasons of clarity, a representation of such connections has been dispensed with, but such connections are known to the person skilled in the art, who will independently set them up according to his wishes.

FIG. 2 describes criteria for checking for the presence of a liquid column on the basis of a schematic and exemplary first measured value curve MW1 and a schematic and exemplary second measured value curve MW2. The first measured value curve corresponds here to a measured value curve acquired by the first monitoring sensor, and the second measured value curve corresponds here to a measured value curve acquired by the second monitoring sensor. The measured value curves can, for example, be measured values of the following measurement variables: mass density, viscosity, sound velocity, conductivity, thermal capacity, electrical capacity. A physical state or different phases of the medium can be deduced from the aforementioned variables.

Here, both measured value curves initially have very similar measured values and thus a small measured value difference MD. With the formation of a static liquid column, in which a liquid level lies between the inlet and the outlet of the measuring tube, a difference between the measured value curves can be greater than is shown here. For example, when a local medium density is measured, air will give a lower measured value than a liquid. If a liquid level of a liquid column is located between the inlet and the outlet of a measuring tube, the first monitoring sensor and the second monitoring sensor will measure markedly different medium densities. If differences between measured values of the first monitoring sensor and the second monitoring sensor exceed a first threshold value in terms of magnitude, this can be interpreted as a presence of a quasi-static or static liquid column with liquid level between the inlet and the outlet of the measuring tube, and a flow rate/mass flow rate of the medium calculated for each differential pressure can be ignored.

A further criterion for determining a presence of a quasi-static or static liquid column with liquid level between the inlet and the outlet of the measuring tube can be a time period Z, during which a size of differences between measured values of the first monitoring sensor and of the second monitoring sensor is at least constant. In this case, constant means that a fluctuation of the difference in relation to the time period Z, for example, measured by a standard deviation or a variance, is less than a defined value. The person skilled in the art can determine such a value without any problem on the basis of physical-technical considerations and/or on the basis of professional experience.

A further criterion for determining a presence of a quasi-static or static liquid column with liquid level between the inlet and the outlet of the measuring tube can be checked by means of a cross-correlation between the first measured value curve and the second measured value curve. In the case of a flowing medium, e.g., when there are gas bubbles in a liquid, the measured value curves can be changed in a characteristic manner with a time delay. This time delay dt can be determined by means of cross-correlation, and provides a basis for determining a second flow rate.

A deviation of the second flow rate relative to a second mean value from the first flow rate and a second flow rate determined by measuring a pressure difference between the inlet and the outlet can be evaluated as a consequence of a static medium state with a liquid level between inlet and outlet.

In the case of a measurement variable other than the medium density, the equivalent will apply.

FIG. 3 describes the course of a method 100 according to the invention.

In a method step 101, a mass flow rate of a medium flowing through the pipeline 10 is measured with a Coriolis volumetric flow meter 20, wherein the Coriolis volumetric flow meter is connected to the pipeline via an inlet 21.1 and an outlet 21.2 of a measuring tube (21).

In a method step 102, a differential pressure of the medium between an inlet-side portion of the pipeline and an outlet-side portion of the pipeline is measured by means of a first pressure sensor 31 and a second pressure sensor 32 and/or a differential pressure sensor 33.

In a method step 103, a first flow rate of the medium through the pipeline is measured on the basis of the differential pressure measurement.

In a method step 104, a medium-related measurement variable other than the medium pressure is measured with a first monitoring sensor 41 in or at the inlet-side portion of the pipeline and a second monitoring sensor 42 in or at the outlet-side portion of the pipeline.

In a method step 105, a measurement of the flow rate for each differential pressure measurement is ignored if a static or quasi-static medium state is determined by means of the monitoring sensors.

Quasi-static means, for example, that a liquid level of the medium or the medium has a movement speed lower than a specified minimum speed of the Coriolis measuring device or with respect to the measurement of flow velocity for each pressure difference measurement.

An installation situation of the Coriolis measuring device can be taken into account here. In the case of a vertical or inclined arrangement of the Coriolis measuring device, a height difference between the pressure sensors thus leads to a pressure difference, which may also have to be taken into account.

The identification of the static medium state preferably has the following steps:
producing a first measured value curve MW1 with the first monitoring sensor 41, and producing a second measured value curve MW2 with the second monitoring sensor 42;
interpreting a measured value difference MD between measured values of the first measured value curve and measured values of the second measured value curve as a consequence of a static medium state if the measured value difference relative to a first mean value of the corresponding measured values is greater than a first threshold value,
and/or
determining a second flow rate from a cross-correlation between the first measured value curve and the second measured value curve and interpreting a deviation of the second flow rate relative to a second mean value from the first flow rate and the second flow rate as a consequence of a static medium state if the deviation is greater than a second threshold value,
and/or
interpreting a measured value difference between measured values of the first measured value curve and measured values of the second measured value curve as a consequence of a static medium state if the measured value difference is constant over a time period (Z).

The first threshold value is preferably, for example, at least 20%, and in particular at least 40% and preferably at least 50%, greater than the first mean value,
and/or
the second threshold value is, for example, at least 20%, and in particular at least 40% and preferably at least 50%, greater than the second mean value.

In this case, it is preferable for the time period Z to be more than 2 seconds, and in particular more than 4 seconds and preferably more than 5 seconds. In this way, it can be ruled out that a measured value difference at slow or low flow rates is occurring due to, for example, a locally different medium composition.

The method steps need not be subject to a strict temporal sequence and can, for example, also be carried out, at least partially, simultaneously. The numbering used serves essentially for identifying the method steps.

The invention claimed is:
1. An arrangement, comprising:
a pipeline;
a Coriolis flow meter comprising at least one measuring tube, in each case with an inlet and an outlet, configured to measure a mass flow rate of a medium flowing through the pipeline;

wherein a first pressure sensor is attached in or on an inlet-side portion of the pipeline and a second pressure sensor is attached in or on an outlet-side portion of the pipeline, and/or wherein a differential pressure sensor is configured to detect a pressure difference between an inlet-side portion of the pipeline and an outlet-side portion of the pipeline, wherein the pressure sensors and/or the differential pressure sensor are configured to determine a flow rate of the medium through the pipeline for each determination of a differential pressure between an inlet-side portion of the pipeline and an outlet-side portion of the pipeline;

wherein a first monitoring sensor is attached in or on an inlet-side portion of the pipeline, and a second monitoring sensor is attached in or on an outlet-side portion of the pipeline, wherein the monitoring sensors are configured to monitor a measurement variable different from the medium pressure in order to identify a static medium state;

wherein the Coriolis flow meter is configured to report a zero flow if a static or quasi-static medium state is determined using the monitoring sensors.

2. The arrangement of claim 1, wherein the measurement variable of the monitoring sensors is at least one from the following list: medium density, viscosity, sound velocity, conductivity, thermal capacity, electrical capacity, physical state of the medium.

3. The arrangement of claim 1, wherein an electronic measurement/control circuit of the Coriolis flow meter is configured to receive and process measurement signals of the monitoring sensors, the pressure sensors, and/or the differential pressure sensor and also to make a statement regarding the flow rate of the medium, or wherein the arrangement has an external computer which is configured to receive and process measurement signals of the monitoring sensors, the pressure sensors, and/or the differential pressure sensor, as well as volumetric flow measured values of the electronic measurement/control circuit, and to make a statement regarding the flow rate of the medium.

4. A method for operating an arrangement, wherein the arrangement includes: a pipeline; a Coriolis flow meter comprising at least one measuring tube, in each case with an inlet and an outlet, configured to measure a mass flow rate of a medium flowing through the pipeline; wherein a first pressure sensor is attached in or on an inlet-side portion of the pipeline and a second pressure sensor is attached in or on an outlet-side portion of the pipeline, and/or wherein a differential pressure sensor is configured to detect a pressure difference between an inlet-side portion of the pipeline and an outlet-side portion of the pipeline, wherein the pressure sensors and/or the differential pressure sensor are configured to determine a flow rate of the medium through the pipeline for each determination of a differential pressure between an inlet-side portion of the pipeline and an outlet-side portion of the pipeline; wherein a first monitoring sensor is attached in or on an inlet-side portion of the pipeline, and a second monitoring sensor is attached in or on an outlet-side portion of the pipeline, wherein the monitoring sensors are configured to monitor a measurement variable different from the medium pressure in order to identify a static medium state; the method comprising the following steps:

measuring with a Coriolis flow meter a mass flow rate of a medium flowing through a pipeline, wherein the Coriolis flow meter is connected to the pipeline via an inlet and an outlet of a measuring tube, measuring a differential pressure of the medium between an inlet-side portion of the pipeline and an outlet-side portion of the pipeline by means of a first pressure sensor and a second pressure sensor and/or a differential pressure sensor, determining a first flow rate of the medium through the pipeline on the basis of the differential pressure measurement, measuring a medium-related measurement variable other than the medium pressure with a first monitoring sensor in or at the inlet-side portion of the pipeline and a second monitoring sensor in or at the outlet-side portion of the pipeline, ignoring the measurement of the flow rate for each differential pressure measurement if a static or quasi-static medium state is determined using the monitoring sensors.

5. The method of claim 4, wherein the identification of the static medium state has the following steps:

producing a first measured value curve with the first monitoring sensor, and producing a second measured value curve with the second monitoring sensor;

interpreting a measured value difference between measured values of the first measured value curve and measured values of the second measured value curve as a consequence of a static medium state if the measured value difference relative to a first mean value of the corresponding measured values is greater than a first threshold value, and/or determining a second flow rate from a cross-correlation between the first measured value curve and the second measured value curve and interpreting a deviation of the second flow rate relative to a second mean value from the first flow rate and the second flow rate as a consequence of a static medium state if the deviation is greater than a second threshold value, and/or interpreting a measured value difference between measured values of the first measured value curve and measured values of the second measured value curve as a consequence of a static medium state if the measured value difference is constant over a time period.

6. The method of claim 5, wherein the first threshold value is at least 20% greater than the first mean value, and/or wherein the second threshold value is at least 20% greater than the second mean value.

7. The method of claim 5, wherein the time period is more than 2 seconds.

8. The method of claim 4, wherein an electronic measurement/control circuit of the Coriolis flow meter receives and processes measurement signals of the monitoring sensors, the pressure sensors, and/or the differential pressure sensor and also makes a statement regarding the flow rate of the medium, or an external computer receives and processes measurement signals of the monitoring sensors, the pressure sensors, and/or the differential pressure sensor, as well as volumetric flow measured values of the electronic measurement/control circuit, and also makes a statement regarding the flow rate of the medium.

* * * * *